United States Patent
Watanabe

(10) Patent No.: US 9,712,248 B2
(45) Date of Patent: Jul. 18, 2017

(54) OPTICAL TRANSMISSION DEVICE AND OPTICAL TRANSMISSION METHOD

(71) Applicant: FUJITSU LIMITED, Kawasaki-shi, Kanagawa (JP)

(72) Inventor: Tomoaki Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 23 days.

(21) Appl. No.: 14/660,045

(22) Filed: Mar. 17, 2015

(65) Prior Publication Data

US 2015/0304050 A1    Oct. 22, 2015

(30) Foreign Application Priority Data

Apr. 18, 2014    (JP) ................................ 2014-086203

(51) Int. Cl.
*H01S 3/00* (2006.01)
*H04B 10/54* (2013.01)
*H04L 7/00* (2006.01)
*H04B 10/25* (2013.01)
*H04J 14/02* (2006.01)

(52) U.S. Cl.
CPC ........... *H04B 10/541* (2013.01); *H04B 10/25* (2013.01); *H04J 14/02* (2013.01); *H04L 7/0041* (2013.01); *H04L 7/0075* (2013.01); *H04B 2210/074* (2013.01)

(58) Field of Classification Search
CPC ............................. H04B 10/541; H04L 7/0075
See application file for complete search history.

(56) References Cited

U.S. PATENT DOCUMENTS

| | | | | |
|---|---|---|---|---|
| 5,973,812 A | * | 10/1999 | Imai | H04B 10/2537 398/192 |
| 6,668,137 B1 | * | 12/2003 | Cordina | H04J 14/0221 398/94 |
| 7,215,464 B1 | * | 5/2007 | Komaki | H04B 10/296 359/337.5 |
| 2003/0137720 A1 | * | 7/2003 | Onaka | H04B 10/2916 359/334 |

(Continued)

FOREIGN PATENT DOCUMENTS

JP    2006-186406    7/2006
WO   WO 2008/114438 A1    9/2008

OTHER PUBLICATIONS

Extended European Search Report issued Aug. 25, 2015 in corresponding European Patent Application No. 15159595.6.

(Continued)

*Primary Examiner* — Oommen Jacob
(74) *Attorney, Agent, or Firm* — Staas & Halsey LLP

(57) ABSTRACT

An optical transmission device includes: an optical splitter configured to branch signal light input from a first optical network; a variable optical attenuator configured to control an attenuation amount of first branched signal light branched by the optical splitter and output the first branched signal light for a second optical network; and a controller configured to detect a modulation component of a signal superimposed on the signal light from second branched signal light branched by the optical splitter and control, based on the detected modulation component, an attenuation amount of the variable optical attenuator, so that the modulation component is suppressed.

11 Claims, 8 Drawing Sheets

(56) References Cited

U.S. PATENT DOCUMENTS

| | | | | |
|---|---|---|---|---|
| 2004/0197105 A1* | 10/2004 | Khatana | ............ | H04B 10/2935 |
| | | | | 398/173 |
| 2010/0027993 A1 | 2/2010 | Yamaguchi et al. | | |
| 2012/0050845 A1* | 3/2012 | Lange | ................. | H04B 10/296 |
| | | | | 359/341.41 |
| 2015/0304050 A1* | 10/2015 | Watanabe | ............ | H04B 10/541 |
| | | | | 398/186 |

OTHER PUBLICATIONS

Yu-Min Lin et al., "Using Superimposed ASK Label in a 10 Gb/s Multihop All-Optical Label Swapping System", Journal of Lightwave Technology, vol. 22, No. 2, Feb. 2004, XP01110984, pp. 351-361.

Ioannis Lazarou et al., "Full-Duplex 4-PAM Transmission for Capacity Upgrade in Loop-Back PONs", IEEE Photonics Technology Letters, vol. 25, No. 12, Jun. 15, 2013, XP011511135, pp. 1125-1128.

* cited by examiner

OPTICAL TRANSMISSION DEVICE AND OPTICAL TRANSMISSION METHOD

CROSS-REFERENCE TO RELATED APPLICATION

This application is based upon and claims the benefit of priority of the prior Japanese Patent Application No. 2014-086203, filed on Apr. 18, 2014, the entire contents of which are incorporated herein by reference.

FIELD

The embodiments discussed herein are related to an optical transmission device and an optical transmission method.

BACKGROUND

As an example of optical transmission technologies, technologies described in Japanese Laid-Open Patent Publication No. 2006-186406 and International Publication Pamphlet No. WO2008/114438 are known. For example, one of the optical transmission technologies is an optical cross-connect device using an MEMS mirror to switch optical paths.

The optical cross-connect device superimposes a control modulation signal of a predetermined frequency (stabilizing control frequency) on a drive signal of the MEMS mirror and performs optimizing control (feedback control) of a mirror angle of the MEMS mirror based on an optical output fluctuation component resulting from the superimposition. In addition, suppression of optical output fluctuation is under study to be able to reduce an impact on other devices of the optical output fluctuation accompanying superimposition of a control modulation signal.

In addition, one of the optical transmission technologies is a technology which superimposes a supervisory signal on main signal light. For example, a supervisory signal may be superimposed on main signal light through intensity modulation of the main signal light with a low frequency.

The conventional technology does not go beyond the study of suppression of the optical output fluctuation component when a modulation signal having a uniform frequency such as the afore-mentioned stabilizing control frequency is superimposed on a mirror drive signal. Stated differently, suppression of the optical output fluctuation component due to an irregular modulation signal which does not having the uniform frequency is not studied. Accordingly, this may lead to deterioration of the transmission quality.

SUMMARY

According to an aspect of the invention, an optical transmission device includes: an optical splitter configured to branch signal light input from a first optical network; a variable optical attenuator configured to control an attenuation amount of first branched signal light branched by the optical splitter and output the first branched signal light for a second optical network; and a controller configured to detect a modulation component of a signal superimposed on the signal light from second branched signal light branched by the optical splitter and control, based on the detected modulation component, an attenuation amount of the variable optical attenuator, so that the modulation component is suppressed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
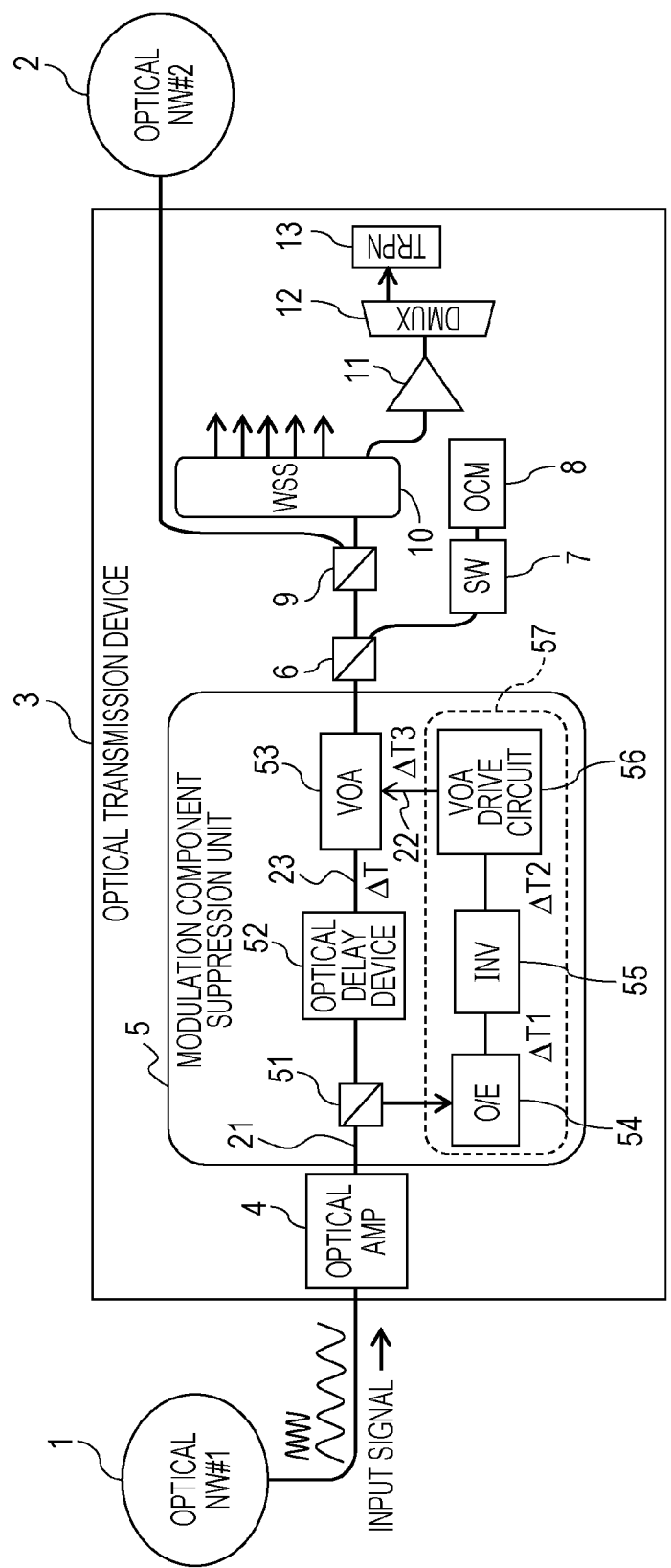
FIG. 1 is a block diagram illustrating a configuration example of an optical transmission system according to a first embodiment.

Embodiments of the present disclosure are hereinafter described with reference to the drawings. However, the embodiments to be described hereinafter are simply exemplary, and not intended to preclude application of different variations or technologies which are not demonstrated hereinafter. Note that in the drawings used in the following embodiments, a part to which a same reference numeral is assigned represents a same or similar part, unless otherwise stated.

FIG. 1 is a block diagram illustrating a configuration example of an optical transmission system according to a first embodiment. The optical transmission system illustrated in FIG. 1 exemplarily includes a first optical network (NW) 1, a second optical network 2, and an optical transmission device 3 connected to each of the optical networks 1 and 2 through an optical transmission line. The optical transmission line is an optical fiber transmission line, for example.

The first optical network 1 may exemplarily be a submarine optical communication network. The submarine optical communication network 1 may include a submarine optical communication device such as an optical repeater installed on the floor of the sea or an optical fiber transmission line. The optical network 1 may be a network configured to transmit light of a single wavelength or a network configured to transmit wavelength-multiplexed (WDM) light which is multiplexed signal light having a plurality of wavelengths. The optical network 1 transmitting the WDM light may be referred to as a "WDM optical transmission system 1".

Supervisory control light may be superimposed on signal light transmitted in the optical network 1. The supervisory control light is also referred to as SV (supervisory) light and superimposed on main signal light through intensity modulation of the main signal light with a low frequency signal which is adequately lower than a frequency of the main signal light. A low frequency signal may be the order of magnitude of kilohertz (KHz), while a frequency of main signal light is the order of magnitude of gigahertz (GHz), for example. The SV light is used to supervise, control, or set elements which constitute the optical network 1, and the like.

The second optical network 2 may exemplarily be a land optical communication network. The land optical communication network 2 may include a land optical communication device such as a reconfigurable optical add/drop multiplexer (ROADM) installed ashore and the like, or an optical fiber transmission line. Similar to the optical network 1, the optical network 2 may be a network configured to transmit light of a single wavelength or a WDM optical transmission system configured to transmit WDM light.

The optical transmission device 3 may exemplarily be a ROADM, transmits (which may also be referred to as "relay") signal light received from the optical network 1 to the optical network 2, and is also capable of transmitting signal light received from the optical network 2 to the optical network 1. Stated differently, the optical transmission device 3 may connect the submarine optical communication network 1 and the land optical communication network 2 by means of light.

FIG. 1 illustrates a configuration example of the optical transmission device 3 when attention is focused on optical transmission in a direction from the optical network 1 to the optical network 2, however, and a configuration example of optical transmission in a reverse direction is not illustrated. The direction from the optical network 1 to the optical network 2 may be referred to as "downstream", and the direction opposite to that direction may be referred to as "upstream".

It may be understood that a configuration example of the optical transmission device 3 focusing on the upstream optical transmission corresponds to a configuration in which the optical network 1 is replaced by the optical network 2 and vice versa in FIG. 1.

Incidentally, one of the optical networks 1 and 2 uses SV light, while the other may dispense with the SV light. For example, in the submarine optical communication network 1, the SV light is used because work such as manual configuration and the like is difficult, whereas in the land optical communication network 2, the SV light may not be used because the work such as manual configuration and the like is relatively easy.

In such a case, if the optical transmission device 3 relays the signal light received from the optical network 1 as it is to the optical network 2, the transmission quality of the signal light to the optical network 2 may deteriorate due to SV light, which is a modulation component superimposed on the signal light. For example, transmission penalty may occur in the signal light to the optical network 2.

For example, the signal light may be relayed as it is from the submarine optical communication network 1 to the land optical communication network 2 without being terminated at the optical transmission device 3 in attempt to extend a transmission distance or reduce the number of spans. In such a case, if unwanted SV light remains superimposed on the signal to the land optical communication network 2, the transmission quality of the signal light may deteriorate.

Hence, in this embodiment, the optical transmission device 3 restrains SV light superimposed on signal light so that the SV light superimposed on the signal light is not transmitted as it is to the optical network 2 where the SV light is unwanted. Thus, the optical transmission device 3 exemplarily includes an optical amplifier (AMP) 4 and a modulation component suppression unit 5.

The optical amplifier 4 amplifies signal light received from the optical network 1 through the optical transmission line. As an example of an amplification medium, a rare-earth doped optical fiber such as an erbium-doped optical fiber (EDF) may be used for the optical amplifier 4. An amplification gain may be set to a value which may compensate any transmission loss of signal light received from the optical network 1, depending on a transmission distance or the number of relays (which may be referred to as "the number of spans") of the signal light.

The modulation component suppression unit 5 is configured to suppress a modulation component of received signal light, which is amplified by the optical amplifier 4, including the modulation component corresponding to SV light (which may be hereinafter referred to as an "SV modulation component" for convenience). The signal light whose SV modulation component is suppressed is transmitted to the optical network 2.

The signal light whose SV modulation component is suppressed may be input to an optical channel monitor (OCM) 8 through an optical splitter 6 and an optical switch 7. The OCM 8 is configured to monitor received power in the unit of a wavelength corresponding to each channel when the received signal light is WDM light, for example.

Exemplarily, a monitor result may be used to control (adjust) signal light power to be transmitted by the optical network 1 to the optical transmission device 3, stated differently, output light power of an optical transmitter (not illustrated) belonging to the optical network 1. The output light power may be controlled in the unit of a wavelength contained in the WDM light. In addition, the monitor result may also be used to control a gain of the optical amplifier 4. The optical splitter 6 may be referred to as an optical tap for monitoring.

In addition, the signal light whose SV modulation component is suppressed may be input to a transponder (TRPN) 13 through the optical splitters 6 and 9, a wavelength selection switch (WSS) 10, an optical amplifier 11, and a wavelength separator (demultiplexer: DMUX) 12. The optical splitter 9 branches the signal light whose SV modulation component is suppressed at the modulation component suppression unit 5, outputs one beam of the branched signal light to the optical network 2, and outputs the other beam of the branched signal light to the WSS 10. Note that the optical network 2 may be connected to the WSS 10. Stated differently, signal light branched by the optical splitter 9 may be transmitted to the optical network 2 by way of the WSS 10.

The WSS 10 is an example of an optical device having a plurality of output ports and capable of outputting to any output port by a wavelength branched signal light to be input from the optical splitter 9. FIG. 1 illustrates an example in which the transponder 13 is optically connected to one of the output ports of the WSS 10 by way of the optical amplifier 11 and the demultiplexer 12. To the WSS 10 may be connected an optical network which is different from the optical network 2.

The optical amplifier 11 amplifies signal light input from the WSS 10. Similar to the optical amplifier 4, as an example of an amplification medium, a rare-earth doped optical fiber may be used for the optical amplifier 11. An amplification gain may exemplarily be set to a value which may compensate any insertion loss of the optical splitter 6, the optical splitter 9, the WSS 10, the demultiplexer 12 and the like. The optical amplifier 11 may be dispensed with as far as the transponder 13 may obtain received power capable of identifying signal light even without compensating insertion loss.

The demultiplexer 12 separates by a wavelength signal light input from the WSS 10 by way of the optical amplifier 11 (or without going through the optical amplifier 11) and outputs the signal light to the transponder 13 corresponding to the separated wavelength. The transponder 13 receives and demodulates the signal light outputted from the demultiplexer 12 by using, for example, a coherent light reception technology or digital signal processing and the like.

The signal light received by the transponder 13 is an example of drop light. Thus, it may be understood that the optical splitter 9, the WSS 10, the optical amplifier 11, and the demultiplexer 12 constitute an example of a "drop optical receiver system" in the ROADM 3. Note that although the transponder 13 is capable of transmitting add light, an "add optical transmission system" is not illustrated in FIG. 1.

A specific configuration example of the modulation component suppression unit 5 is described hereinafter. As illustrated in FIG. 1, the modulation component suppression unit 5 of this embodiment exemplarily includes an optical splitter 51, an optical delay device 52, a variable optical attenuator (VOA) 53, an optical/electrical converter (O/E) 54, an inverter (INV) 55, and a VOA drive circuit 56. The optical/electrical converter 54, the inverter 55, and the VOA drive circuit 56 constitute an example of a controller 57.

The optical splitter 51 braches signal light (see the symbol 21) input from the optical amplifier 4, inputs one beam of the branched signal light to the optical delay device 52, and inputs the other beam of the branched signal light to the optical/electrical converter 54.

The optical/electrical converter 54 photoelectrically converts signal light input from the optical splitter 51 into an electric signal and inputs the electric signal to the inverter 55. An electric signal is a signal obtained by converting, into a voltage value by a transimpedance amplifier and the like, a current value corresponding to received light power, obtained by a light receiving element such as a photodiode (PD), for example.

Here, since an SV modulation component is superimposed on the signal light input from the optical splitter 51 to the optical/electrical converter 54, intensity (amplitude) change corresponding to the SV modulation component appears in an electric signal obtained by optical/electrical conversion. In the electric signal, delay of certain time $\Delta T1$ corresponding to the optical/electrical conversion process with respect to signal light 21 input to the optical splitter 51 is generated.

The inverter 55 inverts intensity of the electric signal input from the optical/electrical converter 54 and inputs the electric signal to the VOA drive circuit 56. The electric signal whose intensity is inverted may be referred to as an "inversion signal". In the inversion signal, delay of certain time $\Delta T2$ corresponding to the intensity inversion process with respect to the input signal to the inverter 55 is generated.

The optical delay device 52 delays the signal light input from the optical splitter 51 only by certain time $\Delta T$ and inputs the signal light to the VOA 53 (see the symbol 23). The signal light delayed by the optical delay device 52 may be referred to as "delayed signal light 23". For example, an optical fiber may be used for the optical delay device 52. Thus, the delay time $\Delta T$ may be adjusted by changing length of an optical fiber (which may be referred to as an "optical delay fiber").

The VOA drive circuit 56 generates a drive signal (see the symbol 22) having a phase and intensity corresponding to the inversion signal input from the inverter 55 and provides the VOA 53 with the drive signal. In the drive signal 22, delay of certain time $\Delta T3$ corresponding to the drive signal generation process with the input signal to the VOA drive circuit 56 is generated.

The VOA 53 may change an attenuation amount (which may be referred to as "VOA loss") depending on the drive signal 22 to be provided by the VOA drive circuit 56 and may change an attenuation amount (stated differently, output light power) of the delayed signal light 23 input from the optical delay device 52.

Since the drive signal 22 of the VOA 53 is generated at the controller 57 based on the signal light 21 input to the VOA 53 in response to the delay at the optical delay device 52, the controller 57 functions as a feedforward controller which performs feedforward controls on the VOA 53. Thus, the drive signal 22 may be referred to as a "feedforward control signal".

Here, when the delay time $\Delta T$ of the signal light 21 by the optical delay device 52 is set to match delay time $\Delta T1+\Delta T2+\Delta T3$ in the drive signal 22 with respect to the signal light 21, the VOA 53 may suppress the SV modulation component superimposed on the signal light 21.

For example, since an attenuation amount may be made variable by the drive signal 22 which is generated based on the inversion signal of the SV modulation component superimposed on the signal light 21, the VOA 53 operates to cancel (or minimize) the SV modulation component superimposed on the signal light 21 (23).

Figure 2:
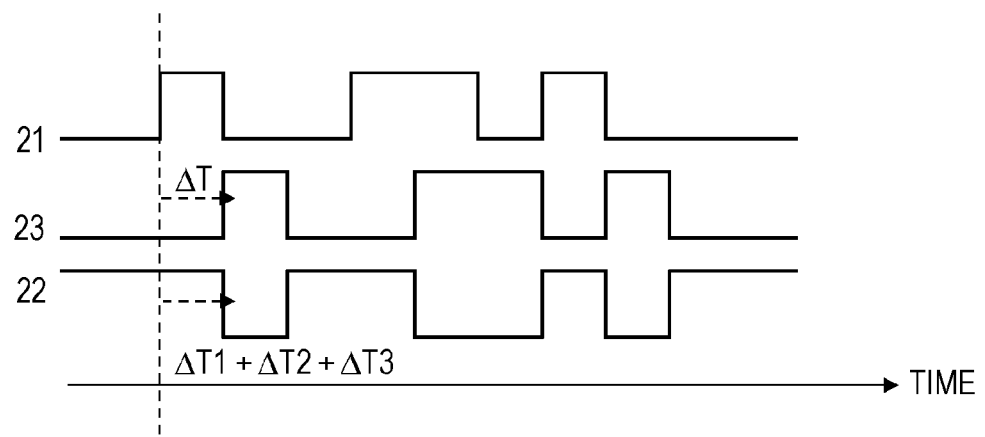
FIG. 2 is a time chart illustrating an operation example of a modulation component suppression unit exemplarily illustrated in FIG. 1.

FIG. 2 exemplarily illustrates how the cancellation operation is done. Note that FIG. 2 illustrates a signal waveform example focusing on the SV modulation component superimposed to the signal light 21.

As exemplarily illustrated in FIG. 2, the signal light 21 input from the optical amplifier 4 is delayed only by the time $\Delta T$ at the optical delay device 52 and input to the VOA 53 as the delayed signal light 23.

On the one hand, in the drive signal 22 of the VOA 53, delay time $\Delta T1+\Delta T2+\Delta T3$ corresponding to each process of the optical/electrical conversion, the intensity inversion, and the drive signal generation is generated with respect to the signal light 21.

Here, the delay time $\Delta T$ (length of a delay optical fiber, for example) at the optical delay device 52 is set so that $\Delta T=\Delta T1+\Delta T2+\Delta T3$. Stated differently, the delayed signal light 23, which is input to the VOA 53, and the drive signal 22 are synchronized. This allows cancellation of the SV modulation component superimposed on the signal light 21 (23).

Thus, even when the optical transmission device 3 receives a signal on which the SV modulation component is superimposed from the optical network 1 using SV light, the optical transmission device 3 may transmit signal light whose SV modulation component is sufficiently suppressed and minimized to the optical network 2 where SV light is unwanted. Stated differently, the optical transmission device 3 may remove the SV modulation component which is unwanted for the optical network 2, in a state in which the SV modulation component is light.

Thus, even when the optical transmission device 3 does not terminate signal light, it is possible to suppress deterioration of the signal quality caused by transmission penalty which occurs in the signal light to the optical network 2 due to an SV modulation component.

Here, the SV modulation component may have an irregular signal waveform, as exemplarily illustrated in FIG. 2, and not a regularly repeating signal waveform such as a modulation signal of a predetermined frequency, for example. In this case, an irregular change may not be sufficiently followed through performing feedback control on the VOA 53, and loss of synchronization between the delayed signal light 23 input to the VOA 53 and the drive signal 22 easily occurs. Consequently, the SV modulation component may not be sufficiently suppressed.

In contrast to this, in the embodiment described above, since the controller 57 performs feedforward control on the VOA 53, an irregularly changing SV modulation component, if any, may be followed, and synchronization between the delayed signal light 23 and the drive signal 22 is easily maintained. Thus, an SV modulation component may be reliably suppressed, no matter how the SV modulation component varies.

Figure 3:
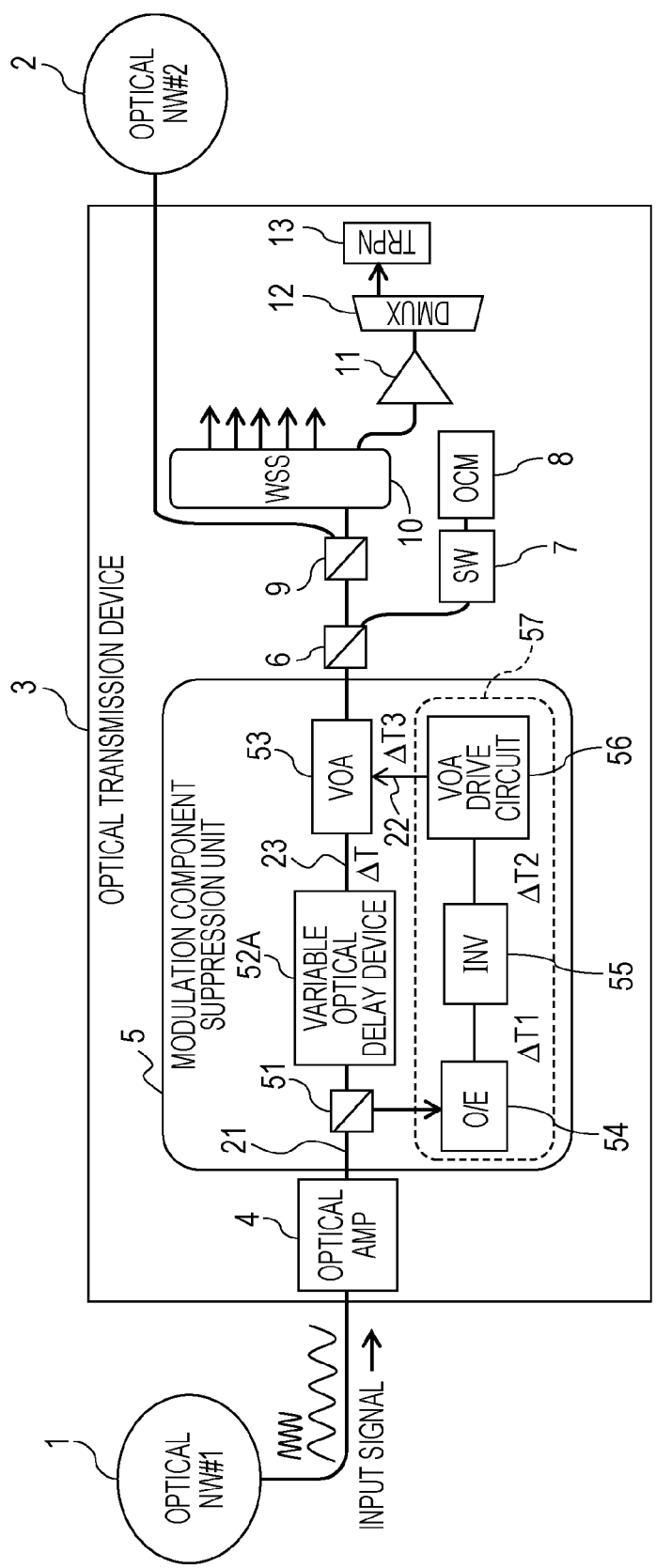
FIG. 3 is a block diagram illustrating a configuration example of an optical transmission system according to a second embodiment.

FIG. 3 is a block diagram illustrating a configuration example of an optical transmission system according to a second embodiment. When compared with the configuration exemplarily illustrated in FIG. 1, the optical transmission system illustrated in FIG. 3 is different in that the optical delay device 52 is replaced by a variable optical delay device 52A in the modulation component suppression unit 5.

The variable optical delay device 52A is exemplarily an optical device capable of delaying input light by making optical path length of the input light variable by means of a prism or a movable mirror and the like.

Use of the variable optical delay device 52A in the modulation component suppression unit 5 facilitates setting or adjustment of $\Delta T = \Delta T1 + \Delta T2 + \Delta T3$ exemplarily illustrated in FIG. 2. Thus, loss of synchronization between the delayed signal light 23 and the drive signal 22 involved in an error between time of designing and time of implementation or a change over time and the like may be easily resolved.

Figure 4:
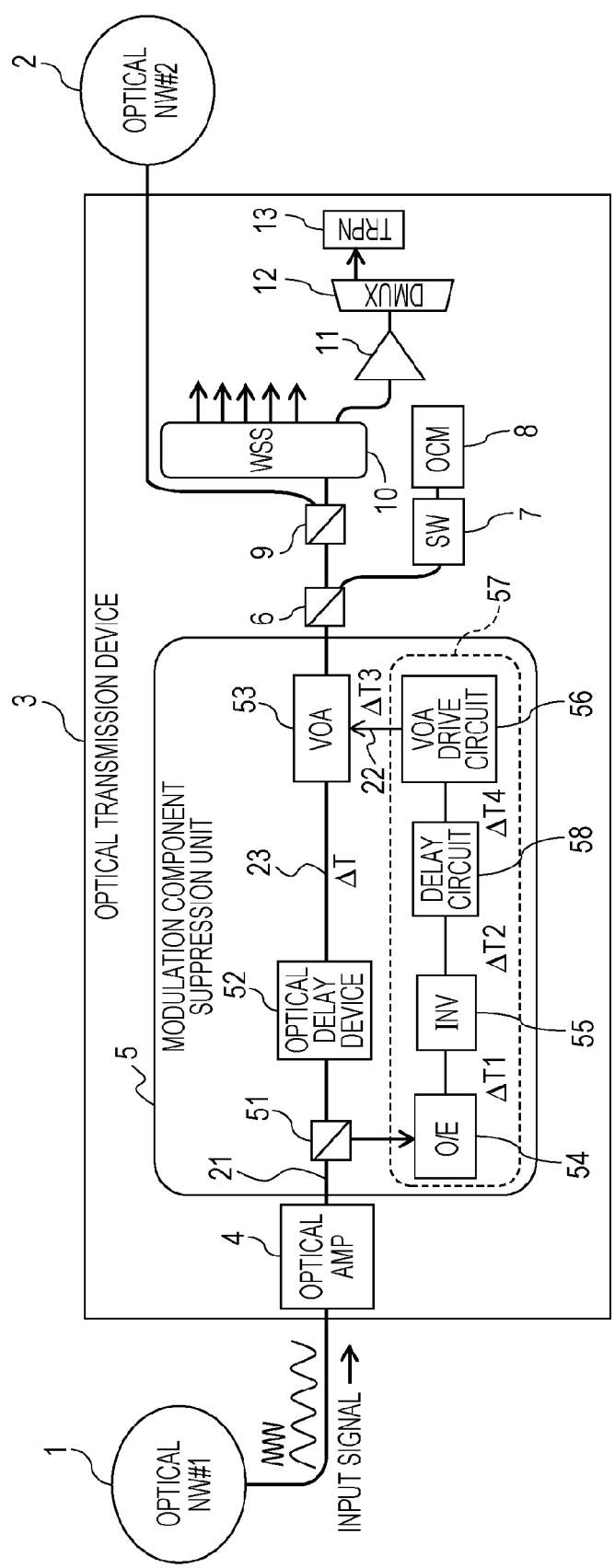
FIG. 4 is a block diagram illustrating a configuration example of an optical transmission system according to a third embodiment.

FIG. 4 is a block diagram illustrating a configuration example of an optical transmission system according to a third embodiment. When compared with the configuration illustrated in FIG. 1, the optical transmission system illustrated in FIG. 4 is different in that a delay circuit 58 is provided between the inverter 55 and the VOA drive circuit 56 in the controller 57 of the modulation component suppression unit 5.

The delay circuit 58 delays an output signal (inversion signal) of the inverter 55 only by certain time $\Delta T4$, for example, and outputs the output signal to the VOA drive circuit 56. Thus, in the drive signal 22 provided to the VOA 53 from the VOA drive circuit 56, delay time of $\Delta T1 + \Delta T2 + \Delta T3 + \Delta T4$ is generated with respect to the signal light 21 before delaying by the optical delay device 52.

Through adjustment of the delay time $\Delta T4$ at the delay circuit 58 so that the delay time $\Delta T1 + \Delta T2 + \Delta T3 + \Delta T4$ matches the delay time $\Delta T$ of the signal light 21 at the optical delay device 52, the input signal light 23 to the VOA 53 and the drive signal 22 may be synchronized.

Thus, similar to the first embodiment, the optical transmission device 3 may transmit signal light whose SV modulation component is sufficiently suppressed and minimized to the optical network 2 where SV light is unwanted, and deterioration of the signal quality caused by transmission power penalty which occurs in the signal light due to the SV modulation component may be suppressed.

Figure 5:
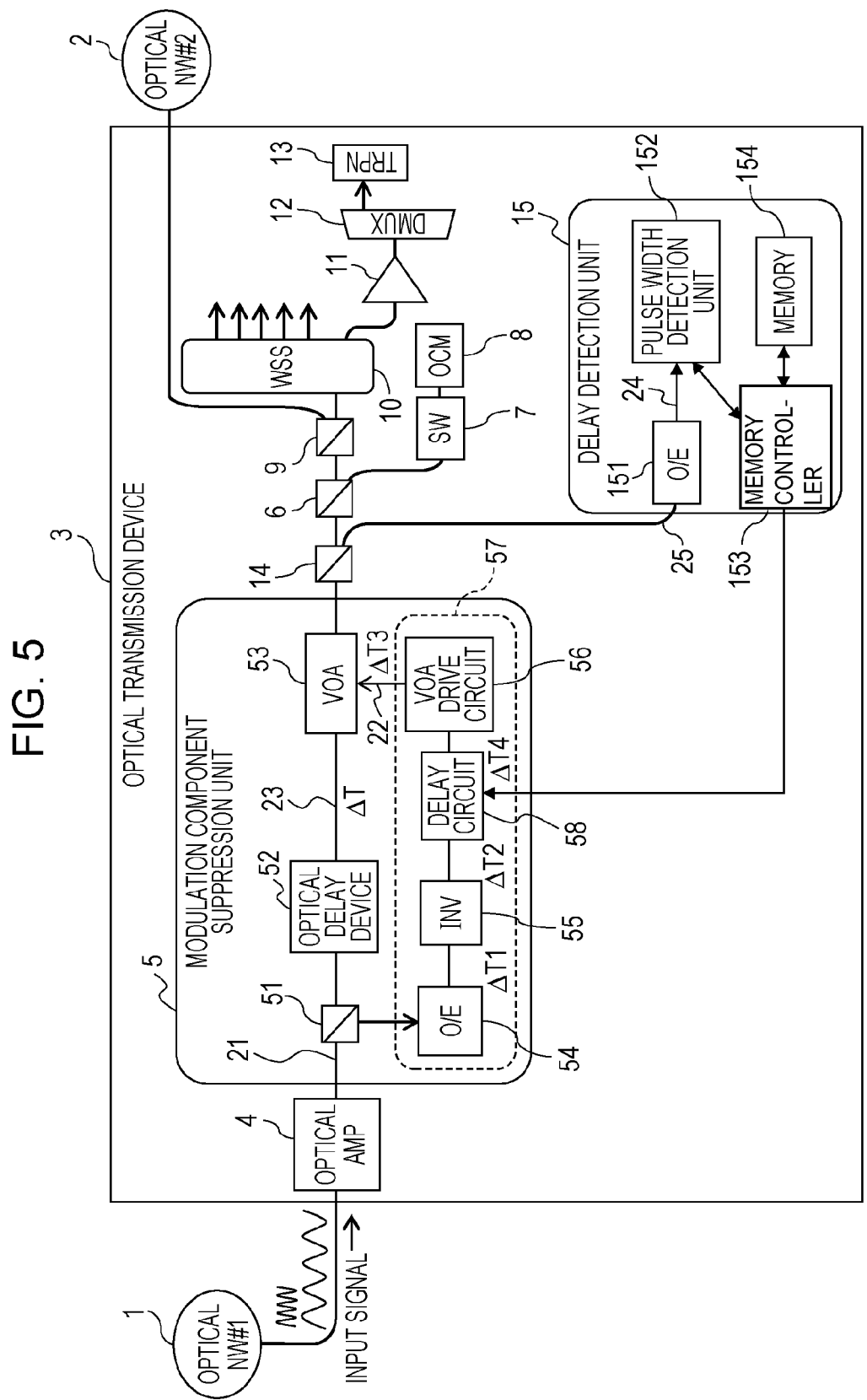
FIG. 5 is a block diagram illustrating a configuration example of an optical transmission system according to a fourth embodiment.

FIG. 5 is a block diagram illustrating a configuration example of an optical transmission system according to a fourth embodiment. When compared with the configuration of the third embodiment exemplarily illustrated in FIG. 4, the optical transmission system illustrated in FIG. 5 is different in that the optical transmission system is additionally provided with an optical splitter 14 in an optical path between the VOA 53 and the optical splitter 6 and that the optical transmission system is additionally provided with a delay detection unit 15.

The optical splitter 14 branches output light of the VOA 53, outputs one beam of the branched light to the optical splitter 6, and outputs the other beam of the branched light to the delay detection unit 15.

The delay detection unit 15 detects from light input from the optical splitter 14 delay time $\Delta T4$ set for the delay circuit 58 and provides the delay circuit 58 with the detected delay time $\Delta T4$. Stated differently, the delay time $\Delta T4$ of the delay circuit 58 is performed feedback control by the delay detection unit 15 based on the output light of the VOA 53. The feedback control enables compensation of the delay time $\Delta T4$ at the delay circuit 58. The delay detection unit 15 is an example of a delay control circuit which controls a delay amount at the delay circuit 58 based on the output light of the VOA 53 so that the afore-mentioned synchronization is established.

Thus the delay detection unit 15 illustrated in FIG. 5 exemplarily includes an optical/electrical converter (O/E) 151, a pulse width detection unit 152, a memory controller 153, and a memory 154.

Similar to the optical/electrical converter 54, the optical/electrical converter 151 converts light input from the optical splitter 14 into an electric signal corresponding to the received light power and inputs the electric signal to the pulse width detection unit 152.

The pulse width detection unit 152 detects pulse width of the electric signal input from the optical/electrical converter 151. The detected pulse width corresponds to the delay time $\Delta T4$ at the delay circuit 58.

The memory controller 153 controls writing and reading to the memory 154. In the memory 154, the pulse width which is detected by the pulse width detection unit 152 and corresponds to the delay time $\Delta T4$ is stored. The memory controller 153 also reads the delay time $\Delta T4$ stored in the memory 154 and sets the delay time $\Delta T4$ in the delay circuit 58. The memory controller 153 is an example of a setting unit which performs the setting.

Figure 6:
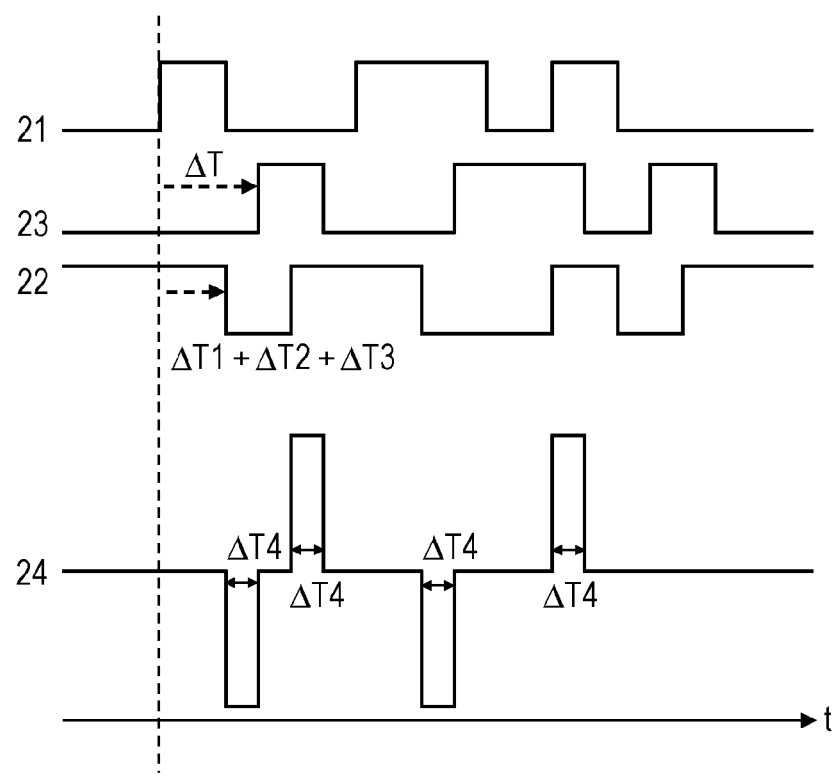
FIG. 6 is a time chart illustrating an operation example of a modulation component suppression unit and a delay detection unit exemplarily illustrated in FIG. 5.

Here, as exemplarily illustrated in FIG. 6, the modulation component suppression unit 5 supposes that a delay difference is generated between the delayed signal light 23 input to the VOA 53 and the drive signal 22. Stated differently, the modulation component suppression unit 5 supposes that $\Delta T \neq \Delta T1 + \Delta T2 + \Delta T3$ and that synchronization between the delayed signal light 23 and the drive signal 22 is lost.

In this case, as denoted by the symbol 24 in FIG. 6, for example, a signal of a waveform having pulse width $\Delta T4$ is input to the pulse width detection unit 152.

The pulse width detection unit 152 detects the pulse width $\Delta T4$. Examples of detection methods include a method for using a clock signal having a sufficiently shorter cycle than the pulse width $\Delta T4$ which may be detected and counting time corresponding to the pulse width $\Delta T4$.

The time $\Delta T4$ detected by the pulse width detection unit 152 is written into the memory 154 by the memory controller 153.

The memory controller 153 reads the time $\Delta T4$ from the memory 154 when the optical transmission device 3 is started, for example, and provides the delay circuit 58 of the controller 57 with the time ΔT4. This sets delay time at the delay circuit 58 to ΔT4.

Figure 7:
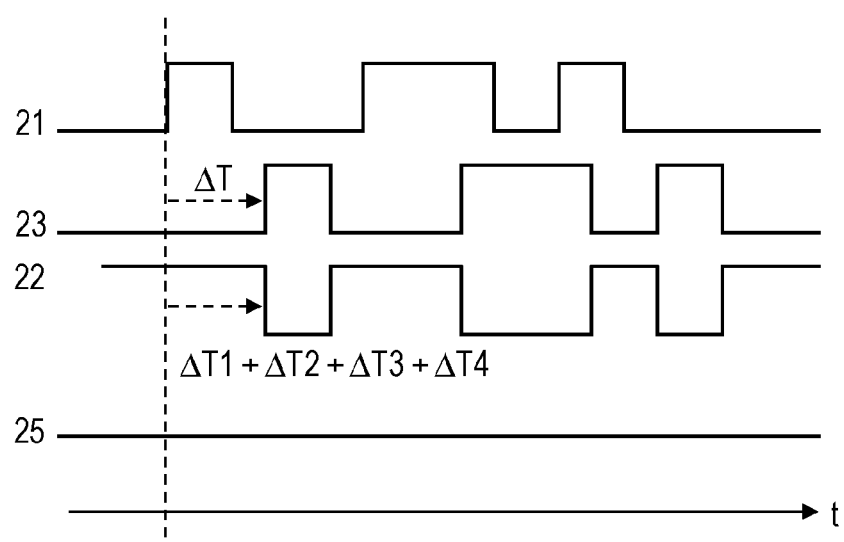
FIG. 7 is a time chart illustrating an operation example of the modulation component suppression unit exemplarily illustrated in FIG. 5.

With this, as illustrated in FIG. 7, for example, the delay difference between the delayed signal light 23 to the VOA 53 and the drive signal 22 is minimized (ΔT=ΔT1+ΔT2+ΔT3+ΔT4), and synchronization between the delayed signal light 23 and the drive signal 22 is established.

Thus, output light of the VOA 53 (stated differently, input light to the delay detection unit 15) is a direct current (DC) signal whose SV modulation component is cancelled, as denoted by the symbol 25 in FIG. 7.

Here, through storage of the pulse width which is detected by the pulse width detection unit 152 and corresponds to the delay time ΔT4, detection and setting of the delay time ΔT4 every time signal light is input to the delay detection unit 15 while the optical transmission device 3 is in operation may be avoided.

Thus, the situation in which the modulation component suppression unit 5 does not suppress an SV modulation component until the delay time ΔT4 is detected and set for the delay circuit 58 may be avoided. Stated differently, if detection (which may also be referred to as "measurement") of the delay time ΔT4 by the delay detection unit 15 is performed before the optical transmission device 3 is put into operation, re-measurement and setting of the delay time ΔT4 during operation may be dispensed with.

It may be understood that the delay time ΔT1, ΔT2, and ΔT3 corresponding to each process of the optical/electrical conversion, the intensity inversion, and the drive signal generation in the controller 57 is uniform as far as the configuration of each block 54 to 56 remains unchanged. Thus, it may also be understood that the pulse width ΔT4 which is detected by the pulse width detection unit 152 depending on a waveform change of the input signal light 21 to the modulation component suppression unit 5 as exemplarily illustrated in FIG. 6 and FIG. 7 is uniform.

Thus, if the pulse width ΔT4 may be detected even once before the optical transmission device 3 is put into operation, re-measurement and setting of the delay time ΔT4 during operation may be dispensed with by storing the pulse width ΔT4 in the memory 154. Use of a nonvolatile storage unit which may hold content of memory without being supplied with power for the memory 154 enables the memory 154 to hold the once detected delay time ΔT4, without relying on power ON/OFF of the optical transmission device 3.

As described above, according to each embodiment described above, the optical transmission device 3 (modulation component suppression unit 5) may suppress an SV modulation component superimposed on signal light transmitted (relayed) from the optical network 1 to the optical network 2, for example.

Thus, increase in transmission penalty due to the SV modulation component of the signal light transmitted to the optical network 2 where the SV modulation component is unwanted may be reduced. Consequently, for example, the optical network 1 using the SV modulation component and the optical network 2 not using the SV modulation component may be connected while minimizing transmission deterioration.

Figure 8:
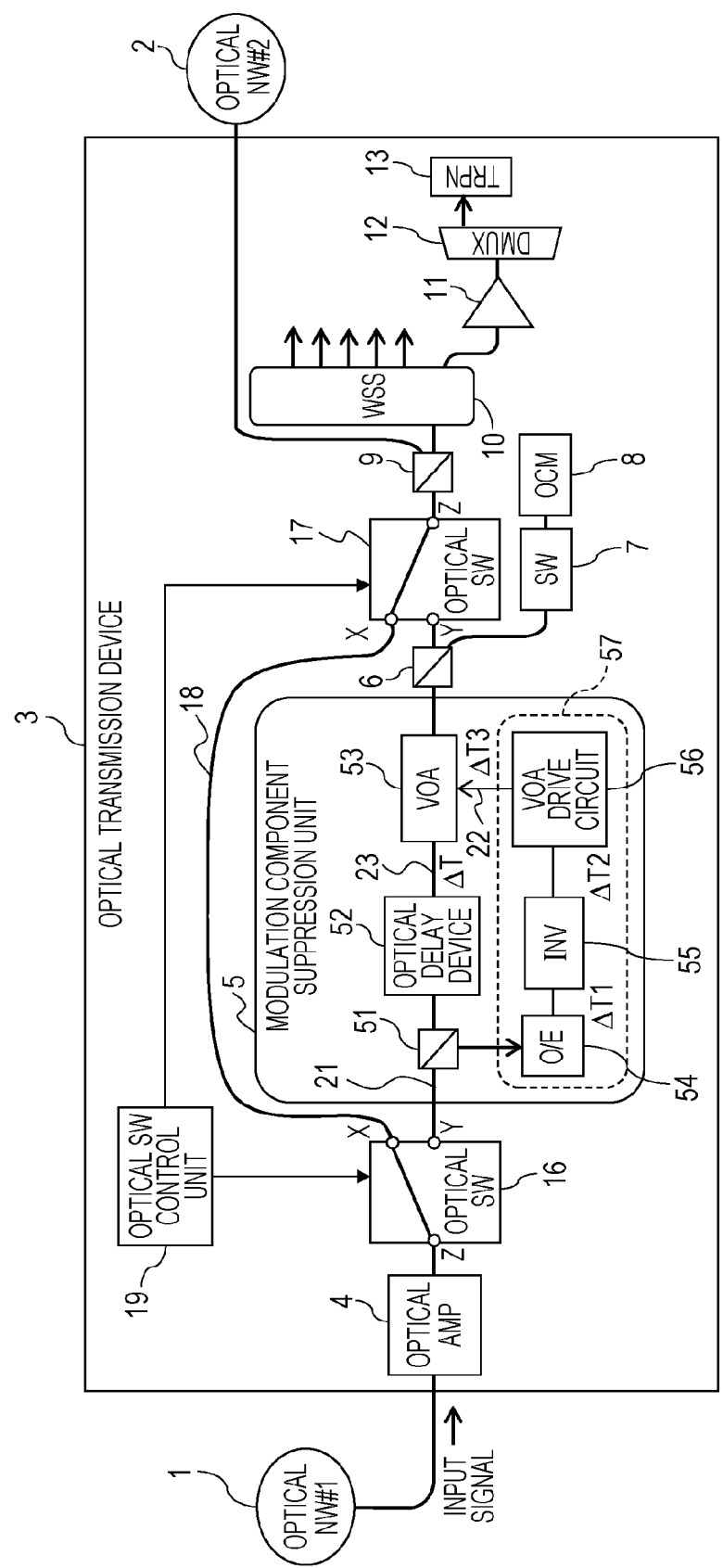
FIG. 8 is a block diagram illustrating a configuration example of an optical transmission system according to a fifth embodiment.

FIG. 8 is a block diagram illustrating a configuration example of the optical transmission system according to a fifth embodiment. When compared with the configuration of the first embodiment exemplarily illustrated in FIG. 1, the optical transmission system illustrated in FIG. 8 is different in that the optical transmission system includes optical switches (SW) 16 and 17, an optical fiber 18, and an optical switch controller 19.

The first optical switch 16 is exemplarily provided between the optical amplifier 4 and the optical splitter 51. The optical switch 16 has one input port Z and two output ports X and Y, for example, in which output of the optical amplifier 4 is connected to the input port Z, the optical fiber 18 is connected to the one output port X, and an input port of the optical splitter 51 is connected to the other output port Y.

The second optical switch 17 is exemplarily provided between the optical splitter 6 and the optical splitter 9. The optical switch 17 has two input ports X and Y and one output port Z, for example, in which the optical fiber 18 is connected to the one input port X, an output port of the optical splitter 6 is connected to the other input port Y, and the input port of the optical splitter 9 is connected to the output port Z.

The optical switch controller 19 controls connection between the input and output ports of each of the optical switches 16 and 17. Exemplarily, the optical switch controller 19 connects the input port Z of the optical switch 16 to any one of the output ports X and Y. The optical switch controller 19 also connects any one of the input ports X and Y of the optical switch 17 to the output port Z. The optical switch controller 19 may be implemented as a function of the controller 57.

As exemplarily illustrated in FIG. 8, when the input port Z of the optical switch 16 is connected to the output port X and when the input port X of the optical switch 17 is connected to the output port Z, light outputted from the optical amplifier 4 is transmitted through the optical fiber 18 to be output to the optical splitter 9.

Stated differently, output light of the optical amplifier 4 bypasses the modulation component suppression unit 5 and is outputted to the optical splitter 9. In this case, the optical fiber 18 may be referred to as an "optical bypass path" which bypasses the optical splitter 51 and the VOA 53.

Thus, the optical transmission device 3 exemplarily illustrated in FIG. 8 may bypass the modulation component suppression unit 5 and relay signal light transmitted (relayed) from the optical network 1 to the optical network 2. For example, if the optical network 1 is a network not using an SV modulation component, the optical transmission device 3 may relay received signal light as it is to the optical network 2.

Stated differently, the optical transmission device 3 may switch its mode between a mode in which an SV modulation component superimposed on signal light from the optical network 1 is suppressed and transmitted to the optical network 2 and a mode in which received signal light is transmitted as it is to the optical network 2 without being subjected to the suppression.

Since one optical transmission device 3 supports each mode, it is possible to flexibly respond to a request for suppressing or not suppressing an SV modulation component and cause the optical transmission device 3 to operate in an appropriate mode.

In addition, if the signal light on which SV modulation component is superimposed is input from the optical network 1 to the optical transmission device 3, the signal light may also be relayed to the optical network 2 through the above-mentioned optical bypass path 18, without the SV modulation component being suppressed. However, in a configuration in which the optical network 1 and the optical network 2 independently superimpose an SV modulation component on signal light, the modulation component suppression unit 5 may suppress the SV modulation component without being bypassed.

In addition, the mode switching (stated differently, bypass control) described above is not limited to the first embodiment and may be applied to any of the second to fourth embodiments described above. In any case, operation and effect similar to the fifth embodiment may be additionally obtained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission device, comprising:
   an optical splitter configured to input a signal light from a first optical network and having a supervisory signal superimposed thereon, and to branch the inputted signal light into a first branched signal light and a second branched signal light;
   a variable optical attenuator configured to attenuate the first branched signal light by an attenuation amount, and to output the attenuated first branched signal light for transmission to a second optical network; and
   a controller configured to detect a modulation component of the supervisory signal superimposed on the signal light from the second branched signal light, and to control, based on the detected modulation component, the attenuation amount of the variable optical attenuator so that the modulation component of the supervisory signal is suppressed in the attenuated first branched signal light output by the variable optical attenuator.

2. The optical transmission device according to claim 1, wherein the supervisory signal is superimposed on the signal light through intensity modulation of the signal light, and the controller comprises:
   an optical/electrical converter configured to photoelectrically convert the second branched signal light, to thereby output an electrical signal;
   an inverter configured to invert an intensity modulation signal obtained from the modulation component of the supervisory signal included in the electrical signal output by the optical/electrical converter, and
   a drive circuit configured to provide the variable optical attenuator with a drive signal corresponding to the inverted intensity modulation signal to control the attenuation amount.

3. The optical transmission device according to claim 2, further comprising:
   an optical delay device, between the optical splitter and the variable optical attenuator, configured to delay the first branched signal light before the first branched signal light is attenuated by the variable optical attenuator, wherein
   an optical delay amount of the optical delay device is set to an optical delay amount with which the first branched signal light and the drive signal, which are input to the variable optical attenuator, are synchronized.

4. The optical transmission device according to claim 3, wherein the optical delay device is a variable optical delay device configured to make the optical delay amount variable.

5. The optical transmission device according to claim 2, further comprising:
   a delay circuit between the optical/electrical converter and the drive circuit; wherein
   a delay amount of the delay circuit is set to a delay amount with which the first branched signal light and the drive signal, which are input to the variable optical attenuator, are synchronized.

6. The optical transmission device according to claim 5, further comprising:
   a delay control circuit configured to control the delay amount at the delay circuit based on the attenuated first branched light output light by the variable attenuator, so that the synchronization is established.

7. The optical transmission device according to claim 6, wherein
   the delay control circuit comprises:
   a pulse width detection unit configured to detect pulse width of the modulation component, from the attenuated first branched light output by the variable attenuator;
   a memory configured to store a detection result by the pulse width detection unit; and
   a setting unit configured to read the detection result from the memory when the delay amount of the delay circuit is to be set, and to set the detection result in the delay circuit as the delay amount.

8. The optical transmission device according to claim 1, further comprising:
   an optical bypass path configured to allow the signal light from the first optical network to bypass the optical splitter and the variable optical attenuator.

9. An optical transmission method, comprising:
   branching, by an optical splitter, signal light from a first optical network and having a supervisory signal superimposed thereon into a first branched signal light and a second branched signal light;
   attenuating, by a variable optical attenuator, the first branched signal light by an attenuation amount;
   outputting the attenuated first branched signal light from the variable optical attenuator for transmission to a second optical network;
   detecting a modulation component of the supervisory signal superimposed on the signal light from the second branched signal light; and
   controlling, based on the detected modulation component, the attenuation amount of the variable optical attenuator so that the modulation component of the supervisory signal is suppressed in the attenuated first branched signal light output by the variable optical attenuator.

10. An optical transmission device, comprising:
    an optical splitter configured to input a signal light from a first optical network and having a supervisory signal superimposed thereon, and to branch the inputted signal light into a first branched signal light and a second branched signal light;
    a variable optical attenuator configured to attenuate the first branched signal light by an attenuation amount, and to output the attenuated first branched signal light for transmission to a second optical network; and a controller configured to include a drive circuit and to detect, by an optical/electrical converter, a modulation component of the supervisory signal superimposed on the signal light from the second branched signal light, and to control, based on the detected modulation component, the attenuation amount of the variable optical attenuator so that the modulation component of the supervisory signal is suppressed in the attenuated first branched signal light output by the variable optical attenuator.

11. The optical transmission device according to claim 10, wherein the optical/electrical converter is configured to photoelectrically convert the second branched signal light, to thereby output an electrical signal, the drive circuit is configured to provide the variable optical attenuator with a drive signal corresponding to an inverted intensity modulation signal to control the attenuation amount, the supervisory signal is superimposed on the signal light through intensity modulation of the signal light, and the controller comprises:

an inverter configured to invert, into the inverted intensity modulation signal, an intensity modulation signal obtained from the modulation component of the supervisory signal included in the electrical signal output by the optical/electrical converter.

* * * * *